Figure 1:
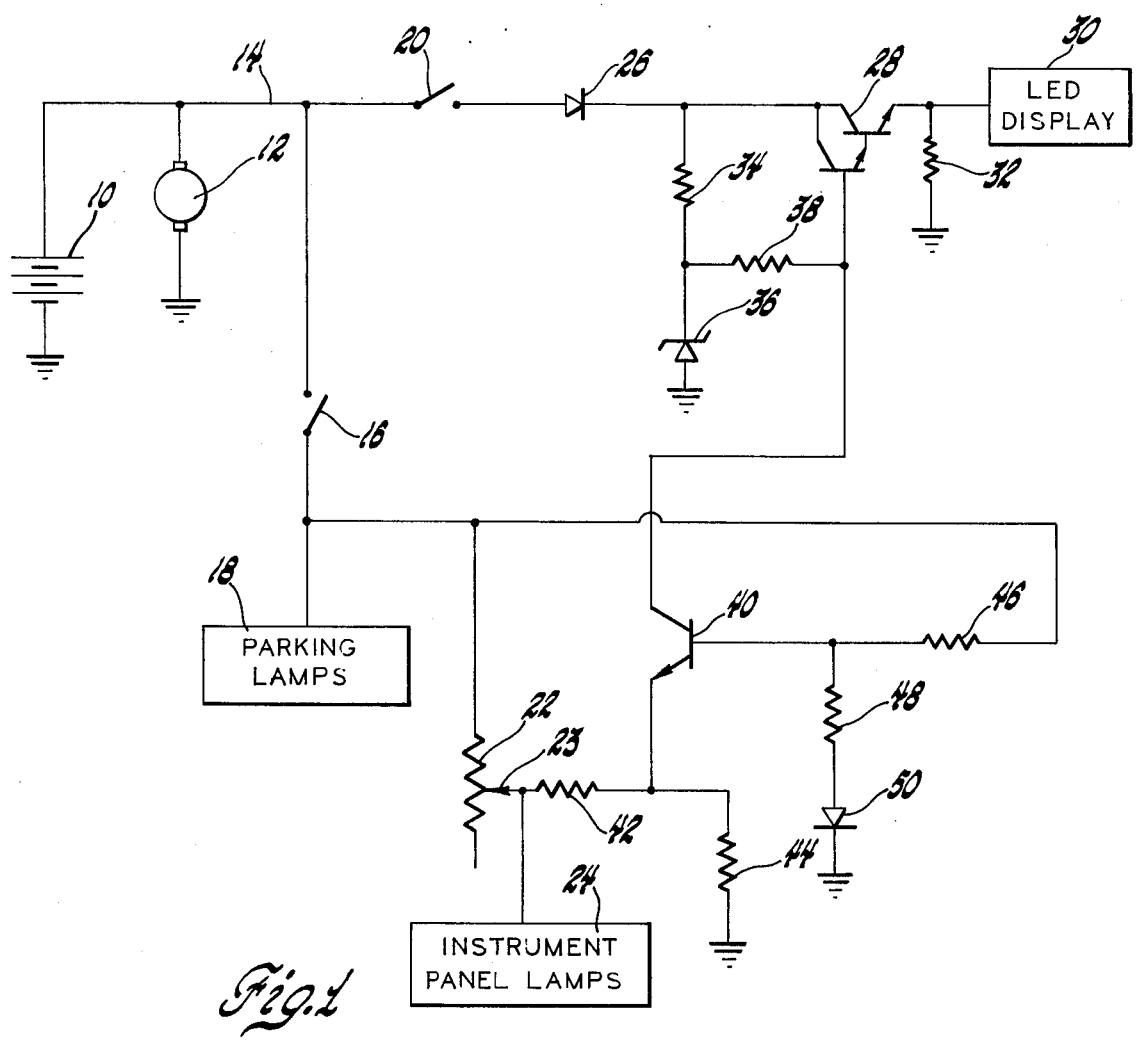

United States Patent [19]

Schultz

[11] 4,029,991

[45] June 14, 1977

[54] INSTRUMENT PANEL ILLUMINATION DIMMING CONTROL

[75] Inventor: Frederick K. Schultz, Bringhurst, Ind.

[73] Assignee: General Motors Corporation, Detroit, Mich.

[22] Filed: Apr. 14, 1976

[21] Appl. No.: 676,730

[52] U.S. Cl. ........................... 315/135; 307/10 LS; 315/77; 315/208; 315/291; 315/297

[51] Int. Cl.² .................. H05B 37/02; H05B 43/00

[58] Field of Search .............. 315/77, 82, 129, 130, 315/133, 135, 208, 291, 297, 307, DIG. 4; 307/10 LS; 340/381

[56] References Cited

UNITED STATES PATENTS

| | | | |
|---|---|---|---|
| 3,295,014 | 12/1966 | Fisher et al. | 315/297 X |
| 3,366,834 | 1/1968 | Potter | 315/135 X |
| 3,938,000 | 2/1976 | Higashide | 315/208 X |

Primary Examiner—Eugene R. La Roche
Attorney, Agent, or Firm—Warren D. Hill

[57] ABSTRACT

The brightness of an LED display on an automobile instrument panel is independent of the battery voltage but does depend on the position of the instrument panel illumination dimmer potentiometer. The voltage applied to the LED is limited to a maximum by a zener diode control circuit and that voltage is reduced by a voltage detector circuit which senses the difference between the battery voltage and the dimmer potentiometer output voltage to reduce the LED voltage in proportion to that difference. The voltage detector circuit is disabled when vehicle parking lamps are turned off to insure maximum LED brightness in daytime driving.

3 Claims, 2 Drawing Figures

INSTRUMENT PANEL ILLUMINATION DIMMING CONTROL

This invention relates to an automobile instrument panel illumination circuit and particularly to such a circuit for providing a variable supply voltage to light emitting diodes on the instrument panel.

It is well known to illuminate automotive instrument panels by incandescent lamps whenever ambient illumination is low. Thus ordinarily the instrument panel illumination is turned on whenever the vehicle parking lights are turned on and the intensity of the instrument panel illumination is controlled by a manually operated dimmer potentiometer. Where, however, the instrument panel includes an instrument such as a clock having a light emitting diode (LED) display, different considerations prevail. For example, during periods of high ambient illumination when instrument panel lamps are normally turned off, the LED display should be at its maximum intensity in order to be readily legible. In addition the LED intensity and the incandescent lamp intensity respond to changes in dimmer voltage in entirely different manners. Still it is desirable to dim the LED illumination when other instrument panel lights are dimmed for night time driving. It is also desirable that the maximum brightness of the LED display be obtainable throughout a wide range of available battery voltages.

It is therefore an object of the invention to provide in an instrument panel illumination circuit having a variable dimmer voltage for instrument panel illumination, a circuit for supplying a variable voltage for a light emitting diode display on the instrument panel.

It is another object of the invention to provide such a circuit which furnishes maximum LED brightness over a wide range of vehicle power supply voltage, and in particular to provide such maximum brightness during high ambient light conditions when instrument panel illumination is turned off.

It is yet another object of the invention to provide such a voltage control circuit wherein the position of the dimmer control potentiometer determines LED intensity irrespective of power supply voltage throughout a wide voltage operating range.

The invention is carried out by providing in an instrument panel illumination circuit powered by a vehicle power supply and having an instrument panel lamp dimmer potentiometer, a control circuit for delivering a voltage to an LED display according to a control voltage applied to that circuit, a voltage regulator for providing a maximum control voltage to the control circuit throughout a wide range of power supply operation voltages to provide full light intensity at the LED display, and a differential voltage detector circuit sensitive to the difference between the power supply voltage and the dimmer potentiometer output voltage to reduce the control voltage to the control circuit and therefore the display intensity by an amount determined by the difference between the power supply and the dimmer output voltages.

The invention further contemplates that the differential voltage detector be disabled when the vehicle parking lights are turned off to insure maximum brightness of the LED display.

Figure 2:
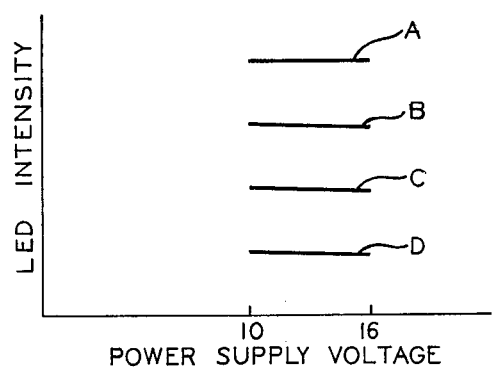

The above and other advantages will be made more apparent from the following specification taken in conjunction with the accompanying drawings wherein like reference numerals refer to like parts and wherein;

FIG. 1 is a schematic diagram of an instrument panel illumination circuit including an LED display intensity control circuit according to the invention, and FIG. 2 is a graphical representation of LED intensity versus power supply voltage according to the operation of this invention.

The circuit of FIG. 1 shows a simplified form of automotive power supply including a battery 10 and a DC generator 12 or equivalent each connected between ground and line 14. The voltage on line 14 can vary between wide limits dependent upon the condition of the battery 10 or the speed of the generator 12. In conventional vehicles, the voltage on line 14 is a nominal 12 volts, however, voltages in the range of 10-16 volts are not unusual. Line 14 is connected through a light switch 16 to the vehicle parking lamp circuit 18 so that the circuit 18 is at the power supply voltage when a switch 16 is closed. The switch 16 when closed also conducts voltage to the manually positioned dimmer control potentiometer 22 having its wiper 23 connected to the conventional incandescent instrument panel lamps 24. The dimmer potentiometer, as is well known, is varied to control the voltage supplied to the lamps 24 to thereby vary their brightness.

An ignition switch contact 20 connects the line 14 to a control circuit for LED display illumination. The switch 20 is connected through a diode 26 to the common collector of a Darlington pair 28 which has its emitter connected to LED display 30 and through a loading resistor 32 to ground. The cathode of the diode 26 is connected through a resistor 34 and a Zener diode 36 to ground to produce a regulated 8 volts at the cathode of the diode 36 which is connected through a resistor 38 to the base of the Darlington pair 28. The Darlington base is connected to the collector of a transistor 40 which has its emitter connected through a resistor 42 to the wiper 23 of potentiometer 22 and through a resistor 44 to ground. The base of the transistor 40 is connected through a resistor 46 to the parking lamp circuit 18 and is also connected through a resistor 48 and a diode 50 to ground.

In operation with the ignition switch 20 closed, the diode 26 prevents negative voltages from damaging the control circuit. The Zener diode provides 8 volts at its cathode and, assuming no current is conducted through transistor 40, substantially 8 volts is supplied to the base of the Darlington pair 28. Due to the base emitter drops in the Darlington pair, 6.8 volts will be supplied to the LED display. This is sufficient to maintain the display at its maximum brightness. The ordinary voltage fluctuations of the vehicle power supply between 10 and 16 volts then have no influence on the display. In addition the voltage regulation provides transient protection to the display.

Dimming of the display is controlled by the transistor 40 which can draw current from the Darlington base to reduce the voltage supplied to the display. When the light switch 16 is open, such as normally occurs during day time driving, there is no current supplied to the base of transistor 40 so that transistor is nonconducting and the display 30 is operating at full intensity. When the switch 16 is closed, current is supplied to the base of the transistor 40 through the resistor 46. Diode 50 is used to offset the base emitter drop of the transistor 40. The voltage on the wiper 23 of potentiometer 22 is supplied through the resistor 42 to the emitter of transistor 40 so that the conduction of the transistor 40 is a function of the difference between the power supply voltage and the dimmer voltage and is independent of the supply voltage. Thus in effect, it is the position of the wiper 23 which determines the current shunted from the Darlington base. Since the shunted current is drawn through the resistor 38, the Darlington base voltage decreases in proportion to the current and the Darlington emitter voltage likewise drops to lower the LED intensity. Preferably the values of resistors 46 and 48 are in the same ratio as resistors 42 and 44 so that the transistor 40 is a detector of the difference between the power supply voltage and the dimmer control voltage.

It should be noted that the voltage at the wiper 23 depends not only upon its position, but also upon the number of instrument panel lamps supplied to the dimmer voltage. This is because the potentiometer 22 and the instrument panel lamps 24 in series therewith comprises a voltage divider which determines the voltage on the wiper 23 and the relative resistance values will depend upon the number of lamps in use. Although the number of lamps varies from one vehicle model to another, compensation for this difference is made by suitable selection of the transistor 40 gain or attenuation which in turn is effected by the chosen values of resistors 38, 42 and 44. Thus by proper selection of the transistor gain, an appropriate match between the LED display brightness and the instrument panel lamp brightness is obtained so that assuming a nominal power supply voltage, the dimming range of the LED display with respect to the dimmer voltage corresponds to that of the instrument panel lights. It will thus be apparent that in addition to gain selection the circuit including transistor 40 has the function of differential voltage detection to control LED intensity and the function of gating to provide maximum brightness when parking lamps are turned off.

FIG. 2 illustrates the LED intensity variation with fluctuations in power supply voltages between 10 and 16 volts for different settings of the potentiometer 22. The line A occurs at the maximum LED intensity and represents the intensity which occurs when the light switch 16 is open or the dimmer voltage of the wiper of potentiometer 22 equals the power supply voltage. The intensity does not vary with fluctuations in the power supply voltage. The lines B, C and D represent LED intensities which occur at positions of the potentiometer wiper 23 for selected reduced illumination levels and illustrate the fact that for each position the LED intensity is substantially constant over the operating range of the power supply voltage. Due to the fact that the instrument panel lamps 24 are part of the voltage divider which establish the dimmer voltage and the resistance of the lamps 24 changes with the voltage, there is a very slight increase of LED intensity for lines B, C, and D as the power supply voltage decreases. This effect, however, is negligible.

It will thus be seen that the circuit according to this invention provides a dimmer control for a LED display which is controlled according to the position of a conventional automotive instrument panel dimmer potentiometer substantially independently of the power supply voltage and which makes available maximum intensity over a wide range of the power supply voltage. Further the LED intensity is established by the dimmer potentiometer position substantially independently of the power supply voltage.

The embodiments of the invention in which an exclusive property or privilege is claimed are defined as follows:

1. In an automotive instrument panel illumination circuit for a vehicle having a power supply subject to voltage fluctuations and a manually positioned dimmer control potentiometer connected to the power supply and providing a variable dimmer voltage for instrument panel illumination, a circuit for providing a variable supply voltage to light emitting diodes on the instrument panel comprising;
    control means having an input terminal for controllably delivering a supply voltage from the power supply to the light emitting diodes according to a control voltage applied to the terminal input,
    voltage regulator means for providing a maximum control voltage to the input terminal of the control means to establish a maximum supply voltage to the light emitting diodes which is sufficient to provide full light intensity,
    means connected to the power supply and the dimmer control potentiometer including a differential voltage detector sensitive to the voltage difference between the power supply voltage and the dimmer voltage for reducing the control voltage at the input terminal of the control means to effect dimming of the light emitting diodes according to the detected voltage difference,
    whereby the light emitting diode intensity is dependent on the dimmer potentiometer position and substantially independent of power supply voltage fluctuations.

2. In an automotive instrument panel illumination circuit for a vehicle having a power supply subject to voltage fluctuations and a manually positioned dimmer control potentiometer connected to the power supply and providing a variable dimmer voltage for instrument panel illumination, a circuit for providing a variable supply voltage to light emitting diodes on the instrument panel comprising;
    an emitter follower transistor device connected to controllably deliver a supply voltage from the power supply to the light emitting diodes,
    a zener diode connected to provide a regulated maximum voltage to the base of the transistor device to establish a maximum supply voltage to the light emitting diodes which is sufficient to provide full light intensity,
    means connected to the power supply and the dimmer control potentiometer including a differential voltage detector sensitive to the voltage difference between the power supply voltage and the dimmer voltage for reducing the voltage at the base of the transistor device to effect dimming of the light emitting diodes according to the detected voltage difference,
    whereby the light emitting diode intensity is dependent on the dimmer potentiometer position and substantially independent of power supply voltage fluctuations.

3. In an automotive illumination circuit for a vehicle having a power supply subject to voltage fluctuations, a manually positioned dimmer control potentiometer connected to the power supply and providing a variable dimmer voltage for instrument panel illumination, and a vehicle parking light circuit powered by the said power supply, a circuit for providing a variable supply voltage to light emitting diodes on the instrument panel comprising;
- control means having an input terminal for controllably delivering a supply voltage from the power supply to the light emitting diodes according to a control voltage applied to the terminal input,
- voltage regulator means for providing a maximum control voltage to the input terminal of the control means to establish a maximum supply voltage to the light emitting diodes which is sufficient to provide full light intensity,
- voltage reducing means connected to the parking light circuit and the dimmer control potentiometer and operable only when the power supply voltage is applied to the parking light circuit, including a differential voltage detector sensitive to the voltage difference between the power supply voltage and the dimmer voltage for reducing the voltage at the input terminal of the control means to effect dimming of the light emitting diodes according to the detected voltage difference;
- whereby the light emitting diode intensity is dependent on the dimmer potentiometer position and substantially independent of power supply voltage fluctuations.

* * * * *